United States Patent [19]

MacDonald et al.

[11] Patent Number: 5,615,143
[45] Date of Patent: Mar. 25, 1997

[54] OPTOMECHANICAL TERABIT DATA STORAGE SYSTEM

[75] Inventors: Noel C. MacDonald; Yu-hwa Lo, both of Ithaca, N.Y.

[73] Assignee: Cornell Research Foundation, Inc., Ithaca, N.Y.

[21] Appl. No.: 308,803

[22] Filed: Sep. 19, 1994

[51] Int. Cl.$^6$ ................................................. G11C 13/00
[52] U.S. Cl. ........................ 365/112; 365/106; 365/120
[58] Field of Search ..................................... 365/112, 106, 365/120

[56] References Cited

U.S. PATENT DOCUMENTS

| | | |
|---|---|---|
| 4,575,822 | 3/1986 | Quate . |
| 4,831,614 | 5/1989 | Duerig et al. . |
| 4,907,195 | 3/1990 | Kazan et al. . |
| 4,916,688 | 4/1990 | Foster et al. . |
| 4,956,817 | 9/1990 | West et al. . |
| 4,962,480 | 10/1990 | Ooumi et al. . |
| 5,036,490 | 7/1991 | Kajimura et al. . |
| 5,038,322 | 8/1991 | Van Loenen . |
| 5,043,577 | 8/1991 | Pohl et al. . |
| 5,051,977 | 9/1991 | Goldberg . |
| 5,053,995 | 10/1991 | Kajimura et al. . |
| 5,091,880 | 2/1992 | Isono et al. . |
| 5,119,227 | 6/1992 | Dawson et al. . |
| 5,126,574 | 6/1992 | Gallagher . |
| 5,128,893 | 7/1992 | Takanashi et al. ........................ 365/112 |
| 5,132,934 | 7/1992 | Quate et al. . |
| 5,144,397 | 9/1992 | Tokuda et al. . |
| 5,144,581 | 9/1992 | Toda et al. . |
| 5,162,819 | 11/1992 | Sakai et al. ................................. 365/112 |
| 5,198,390 | 3/1993 | MacDonald et al. . |
| 5,235,187 | 9/1993 | Arney et al. . |
| 5,287,082 | 2/1994 | Arney et al. . |

OTHER PUBLICATIONS

Kirk et al "Nanostructures and Mesoscopic Systems," *Proceedings of the Internation Symposium*, Academic Press, Inc., 1992 pp. 25–33.
Arney et al "Formation of submicron silicon–on–insulator structures by lateral oxidation of substrate–silicon islands," *J. Vac. Sci. Technol. B 6(1), Jan./Feb. 1988*, pp. 341–345.
Zhang et al "An RIE Process for Submicron, Silicon Electro–Mechanical Structures," School of Electrical Engineering and The Nanofabrication Facility, 1991, pp. 520–523.

*Primary Examiner*—Terrell W. Fears
*Attorney, Agent, or Firm*—Jones, Tullar & Cooper, P.C.

[57] ABSTRACT

An ultra-high density optical storage system includes an array of nanometer-scale emitter tips which are associated with corresponding storage surfaces. The tips are optically selectively activated to produce data features simultaneously on their corresponding storage surfaces, with the resulting data features having diameters approximately the same as the diameters of the emitter tips. The array is scannable to selected locations, whereby a data set can be stored in parallel at each location. Because of the small size of the data features, the locations of adjacent features can be spaced apart by a distance on the order of 10 nm for ultradense storage.

Stored data can be selectively read out optically by positioning the emitter tip array at the location of the data set to be read and directing light onto the storage surfaces for each tip. Light reflected from the surfaces will correspond to the presence or absence of a data feature at each tip for parallel readout. Alternatively, each storage surface may be a part of a corresponding light emitter activated by the presence or absence of a feature.

49 Claims, 7 Drawing Sheets

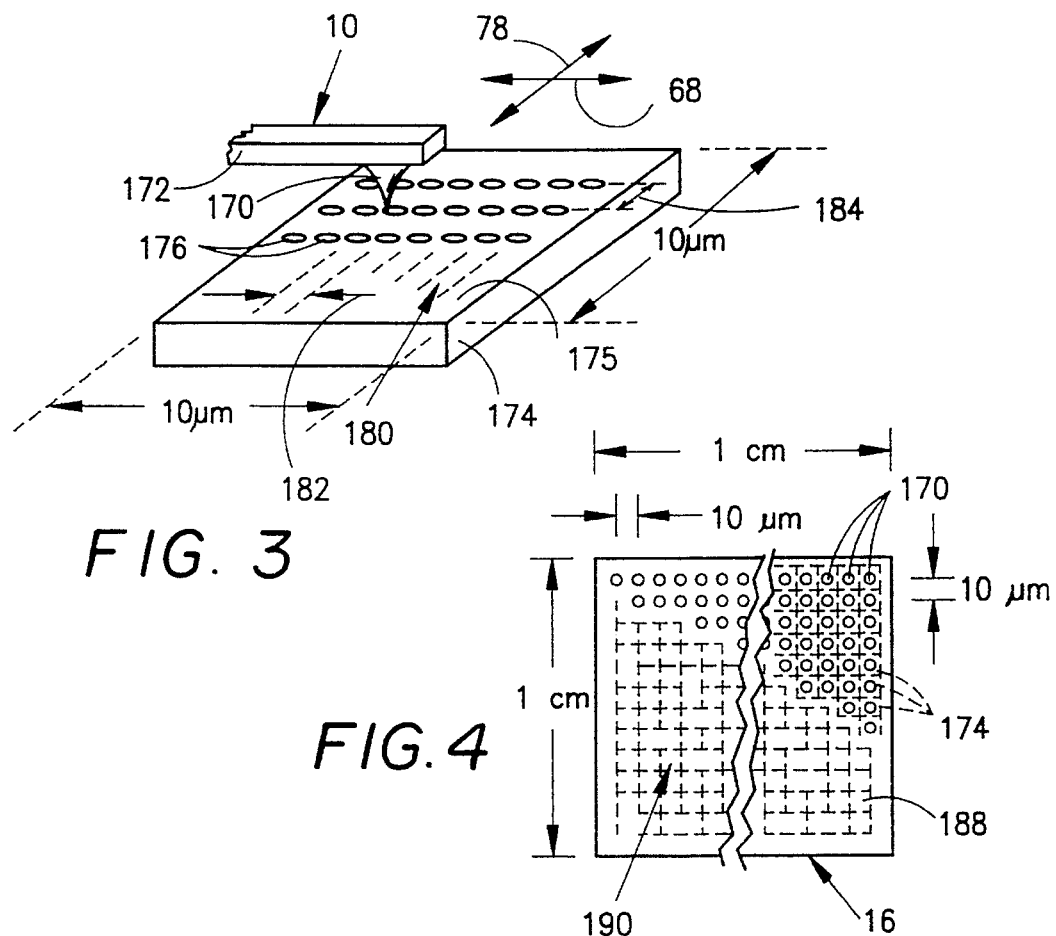
FIG. 3
FIG. 4
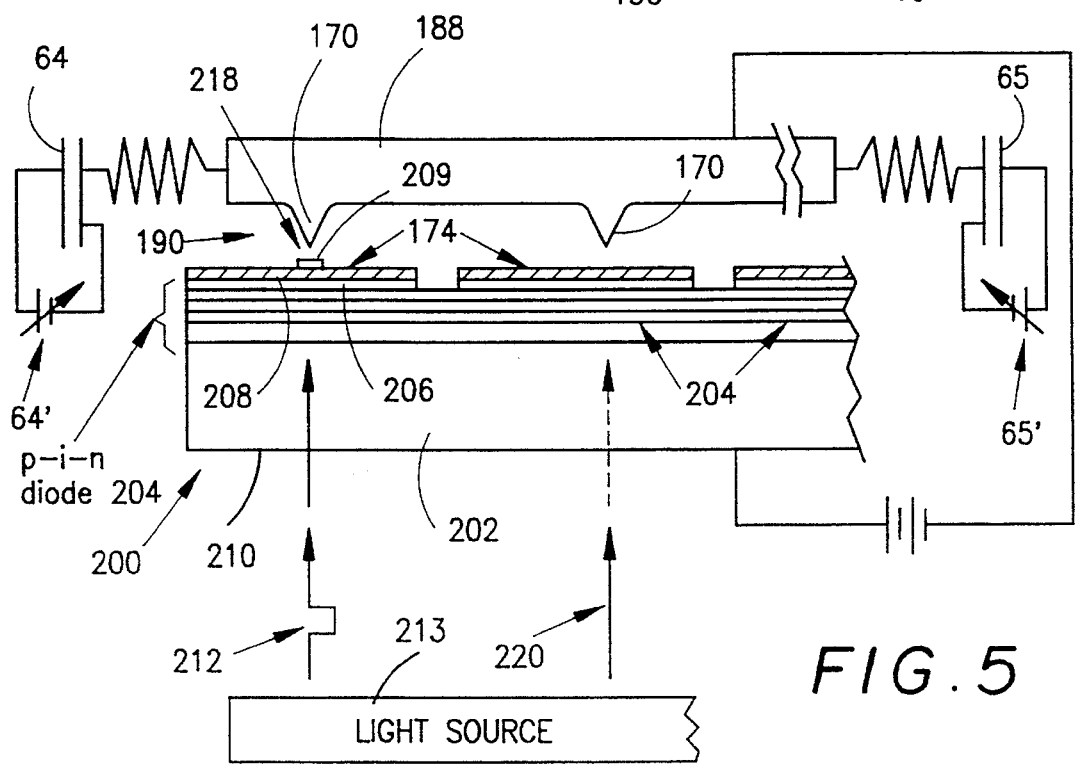
FIG. 5

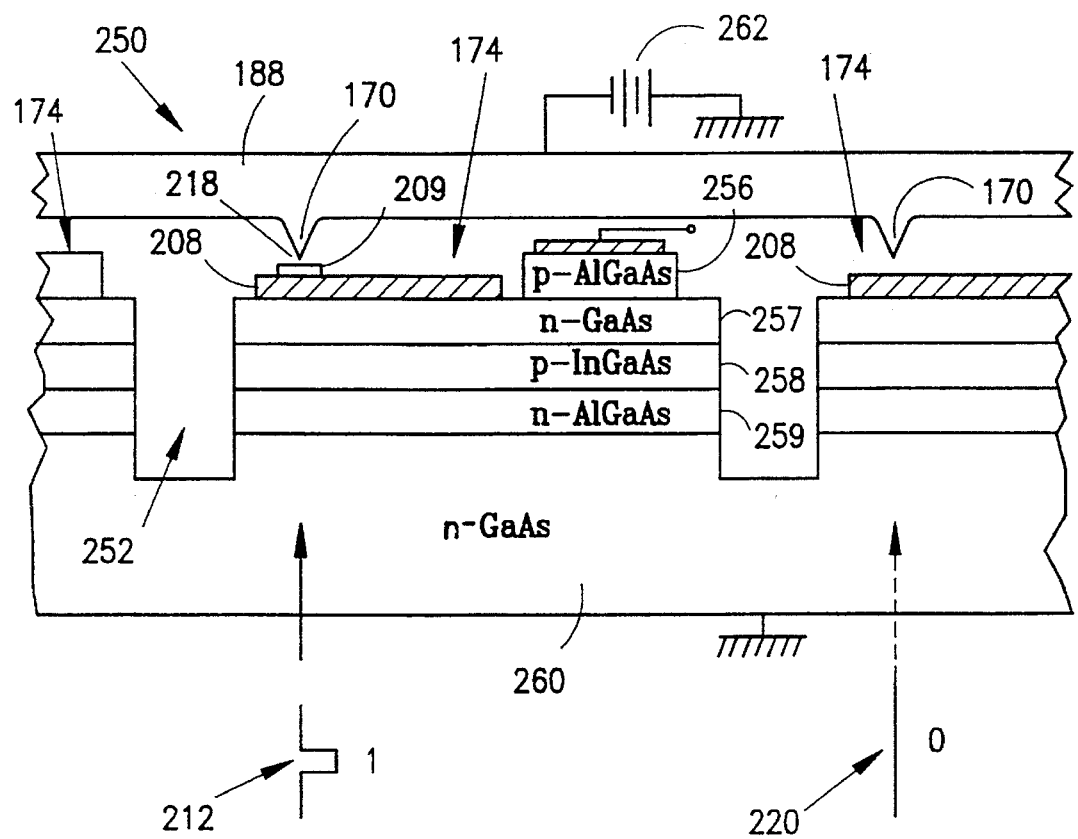
FIG. 9
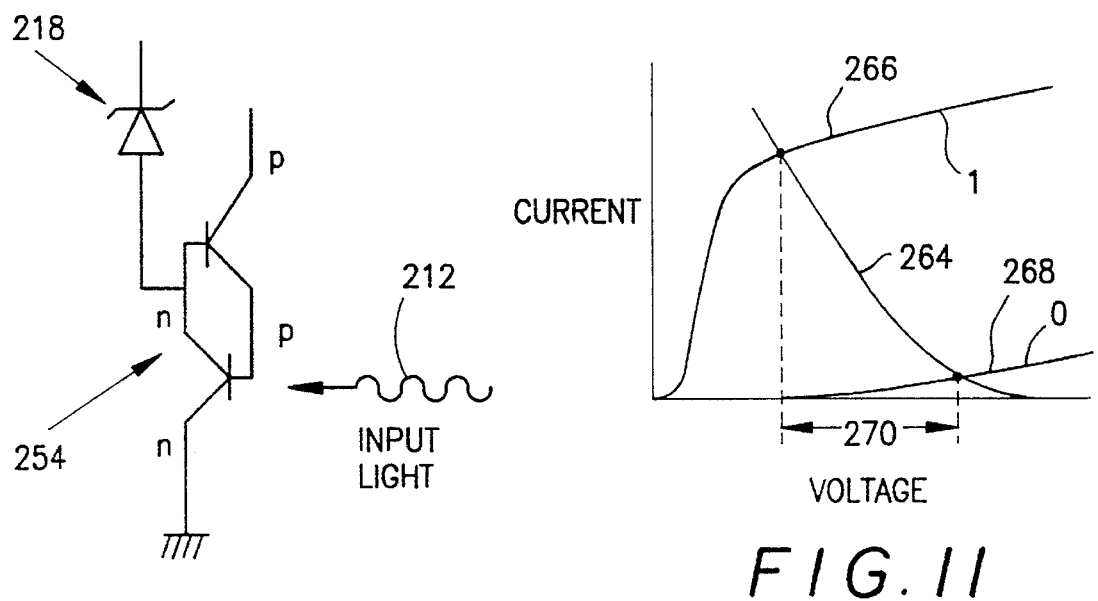
FIG. 10
FIG. 11

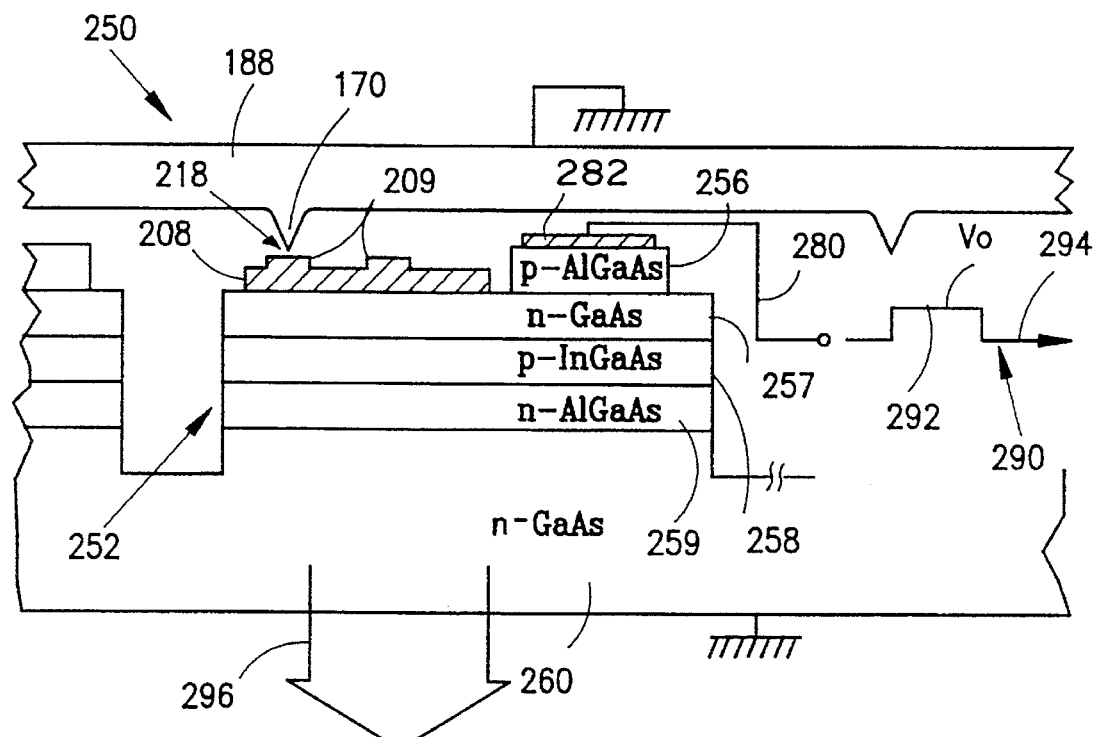
FIG. 12
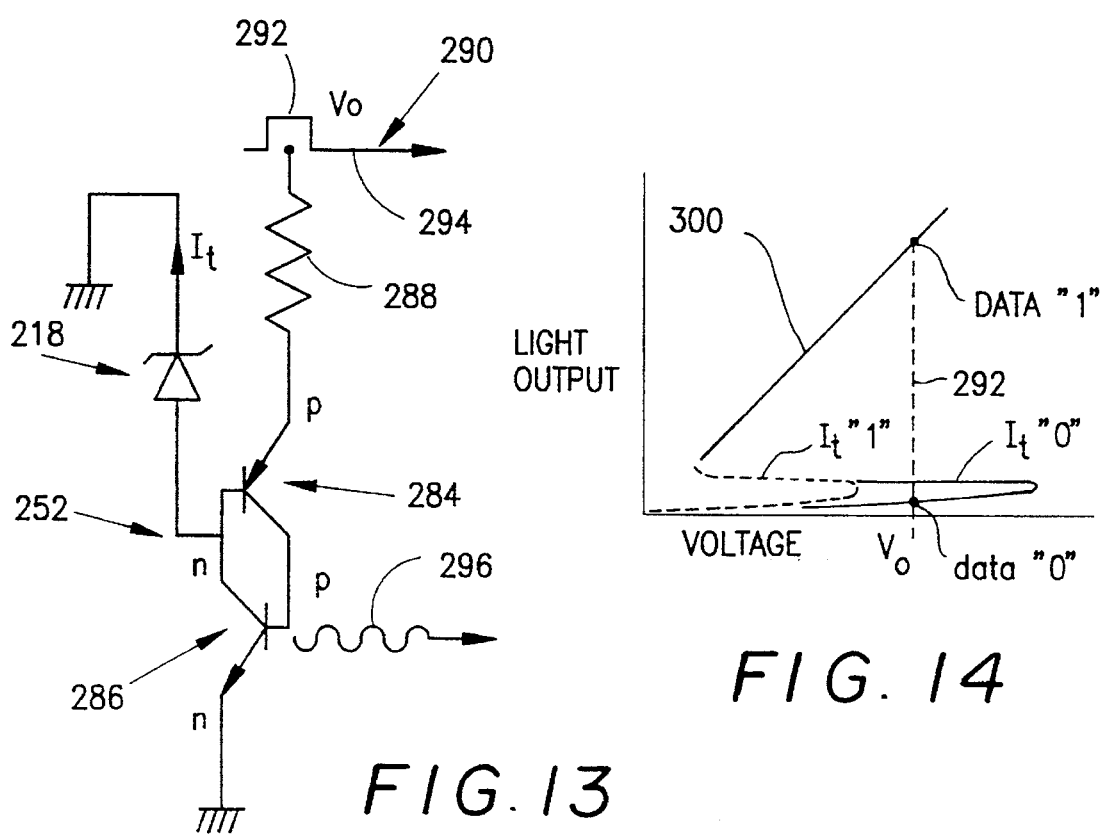
FIG. 13
FIG. 14

OPTOMECHANICAL TERABIT DATA STORAGE SYSTEM

BACKGROUND OF THE INVENTION

The present invention relates, in general, to high density data storage and retrieval systems and more particularly to systems capable of storing immense quantities of digital data in a short period of time and in a small space and for effectively retrieving such data.

A great deal of research has gone into the development of systems for the effective and efficient storage of large quantities of data, and to systems for retrieving that data rapidly and effectively. Humans relate to images, and it is particularly in the storage and retrieval of digital representations of various images that major problems occur. For example, the storage of digital data representing a single television image may require 0.5 million bits of data, or more. Recording a typical television program, wherein the television transmission provides 30 frames or images per second requires storage of digital representations of 100,000 frames per hour, so the storage of one hour's worth of television transmission would require storage of 50 billion bits of data. Conventional optical disc storage systems can only store a few frames, so the digital storage of television or related information has been impractical.

Another problem in the storage of digital representations of images and other high density digital data is the difficulty of retrieving such data, for the sheer volume of the data makes recovery extremely difficult. Parallel storage and recovery increases speed, but places stringent requirements on the recording medium, as well as on the equipment for producing the data to be stored or retrieved. Thus, there is a real and growing need for an extremely high volume digital data storage and retrieval system which not only records large quantities of data on a two-dimensional storage medium, but which provides high resolution image recording and storage. In addition, there is a need for a system for rapidly and nondestructively recovering such stored data and for a system which permits selective erasure of stored data.

SUMMARY OF THE INVENTION

Briefly, the present invention is directed to a data storage system which combines mechanically scanned nanometer-scale emitter tips with optical imaging procedures to produce high resolution, high density image storage and image retrieval. An array of emitter tips is mounted on a movable platform, with the tips being above and closely adjacent to a top surface of a storage medium such as a photoconductor. When an optical image or other optical pattern to be stored is directed onto a bottom surface of the storage medium, the conductivity of the photoconductor is changed wherever light strikes the medium, producing a corresponding voltage pulse between the top surface of the storage medium and an adjacent tip, the voltage amplitude corresponding to light intensity. Each tip in the array simultaneously receives a voltage pulse corresponding to the image intensity at its particular location, thereby providing parallel outputs from the activated tips in the array. These outputs represent one frame of the impinging image and can then be recorded for data storage.

The array of tips may be moved to scan the image, in one embodiment, to obtain a multiplicity of image frames and since the tips have diameters in the range of a few nanometers, such scanning can produce extremely high resolution parallel storage of an optical image. The tips and the array may be spaced apart by about 10 nm, but since the tips will detect data only at the tip location, incremental scanning and repetitive storage of data produces the high resolution storage.

In a preferred form of the invention, the storage medium may be a p-i-n multiple quantum well photodiode, with the top surface of the photodiode being covered by a thin layer of an electrically conductive material having surface properties susceptible to an electric field; for example, a thin layer of gold. An optical image directed onto the bottom surface of the storage medium changes the voltage/current characteristic of the diode and produces at each of the tips in the array a voltage pulse corresponding to the intensity of the light impinging on the bottom surface in the region of the tip. Voltage pulses above a predetermined threshold will create a field which produces a "feature" for example, a depression or a small dot; such as a lump of gold, at the location of the tip, each feature will have a dimension comparable to the dimension of its corresponding tip; i.e., a few nanometers in diameter. The presence or absence of a feature corresponds to a "1" or a "0" data state so that the image is stored as an array of 1s and 0s on the storage medium.

The data stored in the form of ones and zeros can be optically read by directing a light beam toward the bottom of the storage medium. Light will be reflected in accordance with different absorption coefficients in the medium which are dependent on, and correspond to, the presence or absence of, and to the location of, the stored features. This enables nondestructive optical parallel readout of the data.

The small size of the tips allows high density storage of data, for the tips may be a few nanometers in diameter, and spaced about 10 μm apart. The spacing between the tips provides 1,000 tips per centimeter or one million tips per square centimeter, so that upon optical activation of the storage medium up to one million features will be produced simultaneously to thereby record a single frame of data. The array of tips is mounted on a platform which is movable in the x and y direction with respect to the top surface of the storage medium in, for example, 10 nm increments. This allows each tip to record features on the storage medium at 10 nm intervals, as the array is moved. With the tips being spaced apart by 10 micrometers, each tip can cover an area 10 micrometers on the side during scanning in the x and y directions. Since the features can be produced at 10 nm increments, each tip can produce one million features in an area 10 micrometers square, with a result that a one square centimeter array of tips can record one million frames, or $10^{12}$ bits of data; that is, a terabit of data. The storage medium can be read optically in the manner described above to provide parallel readouts of each frame of data.

An alternative to the foregoing optical storage and readout is an optoelectronic system wherein the storage medium utilizes a pnpn semiconductor which acts as a phototransistor to increase the contrast ratio between "1" and "0" points in an image to be recorded, and thereby eliminates the need for a laser light source for the image to be recorded. The presence of a light pulse, which is to be recorded, on the bottom layer of the phototransistor produces a corresponding current determined by the intensity of the light and the gain of the transistor. This current develops a voltage between the phototransistor surface, which may be coated, for example with gold, and the adjacent emitter tip. The resulting field between the tip and the surface of the storage medium produces a "feature" in the gold layer wherever a voltage is present. Where no light impinges on the phototransistor, there is no current so the transistor remains off and no feature is produced. The optical image impinging on the bottom of the phototransistor storage medium produces a corresponding pattern of "features" on the top surface, as discussed above for parallel recording of the data one frame at a time.

The data stored optoelectronically, in the manner described above, may be read by supplying a voltage to the top (P layer) surface of the pnpn phototransistor and by supplying a bias voltage to the tips. The bias voltage on each tip causes a current flow between the storage medium and any tips aligned with a "feature". No current, or a lower current, flows for tips not so aligned. This tip current flow reduces the turn-on voltage required for the phototransistor, which functions as a thyristor in the read mode, so the presence of a "feature" switches it on, causing it to emit light. This light is emitted through the bottom of the storage medium in an intensity pattern corresponding to the features stored at the locations of the tips in the array. The array may then be shifted and again activated to produce a second output pattern corresponding to the adjacent "feature" pattern frame, and so on for parallel readout of all of the stored data frames.

In a still further embodiment of the invention, the conductive coating on the surface of the storage medium is replaced by a conductive coating on the surface of the tip. In this case, the writing of data for storage is produced by a voltage between the tip and the pnpn storage medium which results from a photocurrent in the storage medium responsive to impinging light. The voltage ejects a small amount of metal by ion emission from the tip onto the surface of the storage medium, thereby producing on the surface a small metal dot. The small metal dot serves as the "feature" discussed above for storage of data. In the read mode, a forward bias is applied to the tips, as noted above. Each tip adjacent an unwritten area (no dot) produces no current flow, because contact resistance blocks such flow. When the tip is in alignment with a dot, a resultant lower contact resistance causes current flow into the pnpn quantum wells to produce light emission. The high quantum efficiency for semiconductor quantum wells results in a power consumption that is sufficiently small to allow one million bits to be read simultaneously and, since the data storage material itself is the light emitting material, no external light source is required.

A movable tip array suitable for use in the storage system of the present invention is described and illustrated in copending application Ser. No. 08/069,725 of Z. Lisa Zhang and Noel C. MacDonald, filed Jun. 1, 1993, now U.S. Pat. No. 5,536,988, and assigned to the assignee of the present application, the subject matter of which is hereby incorporated herein by reference. As described in that application, a tip array is provided on a central stage of a compound stage microelectromechanical microactuator which is fabricated using a modified single crystal reactive etching and metallization (SCREAM) process such as the process described in U.S. Pat. No. 5,198,390. The central stage is mounted in a frame support assembly including three stages which are interconnected to provide motion along x and y axes. The tip array is made up of a multiplicity of integrated microdynamic emission cathodes which are fabricated utilizing the SCREAM process described in U.S. Pat. No. 5,198,390 and thus preferably are fabricated from single crystal silicon in a process which is compatible with standard silicon processing.

As explained in detail in U.S. Pat. No. 5,536,988, the central stage of the microactuator is mounted so as to provide controlled incremental movement of all of the tips simultaneously. The impinging light from the images to be stored convert each tip into an optically controlled switch, producing "1" bits for storage in areas exposed by the impinging light and producing "0" bits in unexposed areas. After writing one frame of two-dimensional data, the tips are moved by a small increment and a second frame of data may be written.

In accordance with the foregoing, therefore, a combination of nanostructures in the form of tips, of optoelectronics, and of micromechanics capable of moving nanometer tips in incremental steps of 10 nm provide terabit storage with optical data throughput and parallelism to provide the system flexibility which is required to achieve a high performance terabit memory.

BRIEF DESCRIPTION OF THE DRAWINGS

The foregoing, and additional objects, features, and advantages of the present invention will become apparent to those of skill in the art from a consideration of the following detailed description of referred embodiments thereof, taken in conjunction with the accompanying drawings, in which:

FIG. 3 is a diagrammatic illustration of an emitter tip and a corresponding storage medium in accordance with the present invention;

FIG. 4 is a bottom view of an array of emitter tips on an actuator, and illustrating corresponding storage regions for each tip;

FIG. 5 is a diagrammatic cross-sectional view of an optical parallel storage device in accordance with a first embodiment of the invention;

FIG. 9 is a diagrammatic cross-sectional view of an optoelectronic parallel data writing storage device in accordance with a second embodiment of the invention;

FIG. 10 is an equivalent circuit for the device of FIG. 9;

FIG. 11 is a graphical illustration of a load line analysis of the device of FIG. 9;

FIG. 12 is a diagrammatic cross-sectional view of an optoelectronic parallel readout scheme for the device of FIG. 9;

FIG. 13 is an equivalent circuit of the device of FIG. 12;

FIG. 14 is a graphical illustration of the light-voltage characteristics of the device of FIG. 12, at different tunnel currents corresponding to 0 and 1 data features.

DESCRIPTION OF PREFERRED EMBODIMENTS

Figure 1:
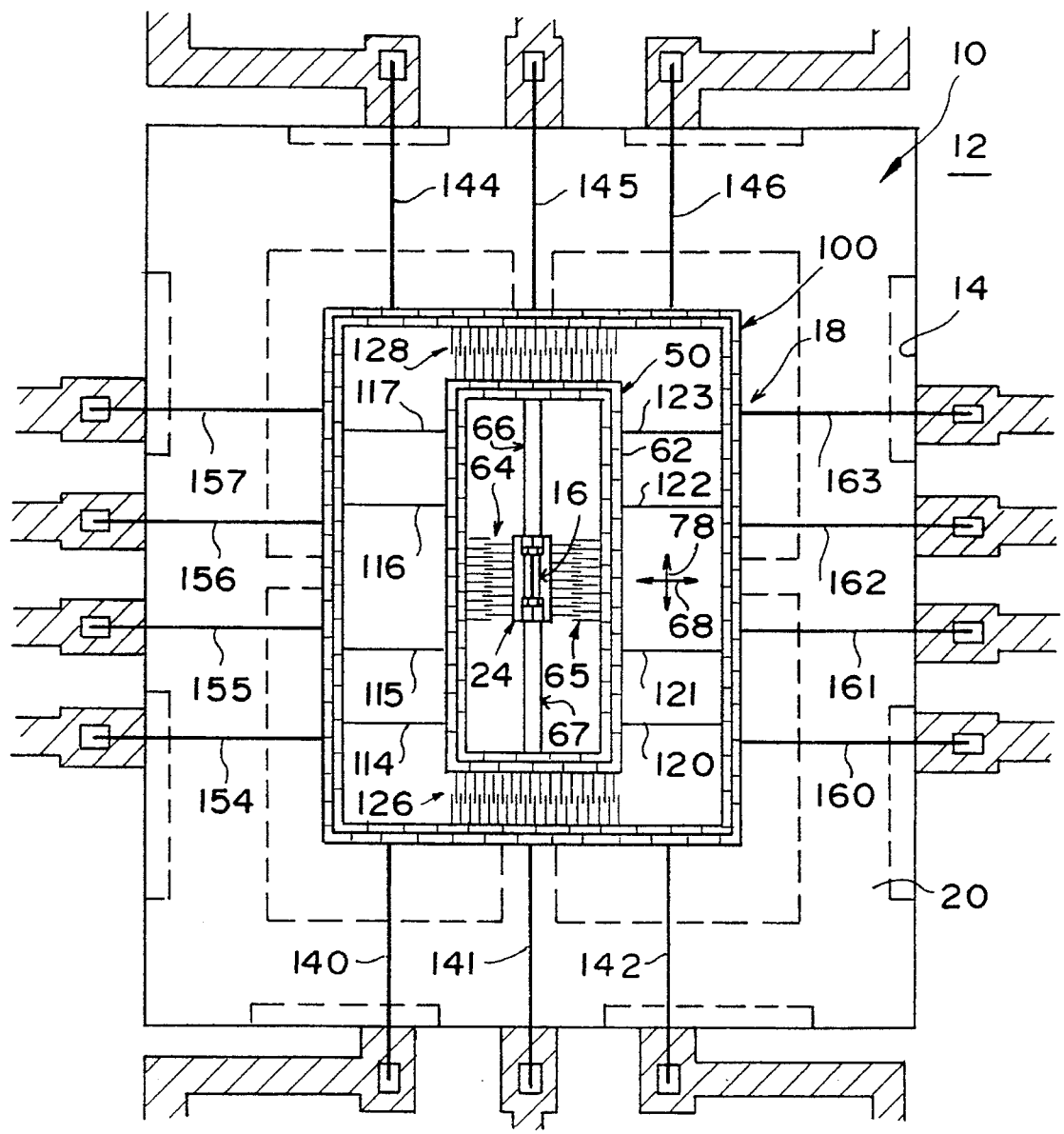
FIG. 1 is a top plan view of microelectromechanical actuator suitable for use in the present invention.

The present invention utilizes, in combination with a storage medium to be described, a microelectromechanical actuator 10 which is diagrammatically illustrated in FIG. 1 and which is described in detail in the above-mentioned U.S. Pat. No. 5,536,988. As noted in that application, the actuator is fabricated from, for example, a single crystal silicon substrate 12 as a released, cantilevered structure within a cavity 14 formed in the substrate. The released structure 10 includes a central stage portion 16 connected to a multistage support assembly 18 which holds the central stage above the floor 20 of the cavity for 6-weight motion in x, y, z, roll, pitch, and yard directions. This central stage portion 16 incorporates microelectronic cathode emitters 22 which preferably are fabricated using the SCREAM process at the same time the remainder of the structure is formed but which in the alternative may be fabricated after completion of the stage and support structure. The multistage support assembly 18 provides an interconnect system which connects external signal sources or receivers (not shown) to the emitters 22 as well as to components of the support assembly for use in control or sensing operations. In the disclosed embodiment, the interconnect system uses parts of the support assembly itself as the electrically conductive element, with suitable insulating segments being provided to define specific signal paths through the assembly. These insulating segments provide mechanical connections between various components of the structure to provide structural integrity while providing electrical isolation between adjacent parts to permit complex interconnection schemes.

The central stage portion 16 (FIG. 2) is supported mechanically within a first support frame stage 24 which includes a frame comprising a released beam 26 surrounding the stage 16 and spaced above the floor 20 of the cavity 14 in the substrate 12. The central stage 16 is fixedly secured within this first, innermost beam so that they move together. In a preferred form of the invention, as illustrated, the frame 26 is rectangular, including opposite sides 28, 30, and 32, 34 surrounding the central stage portion 16, and is coplanar therewith.

The support frame stage 24 includes a plurality of interconnect beams 36 to 38 and 40 to 42 extending inwardly from the frame sides 28 and 30, respectively to secure the central stage 16 in place. The beam 26 extends circumferentially around the central stage and provides a rigid support frame to permit precision positioning of the stage. Preferably, beam 26 is formed with a high aspect ratio for stiffness in the vertical direction, and although illustrated as a single beam, may incorporate plural parallel circumferential beams.

The first support frame stage 24 is mounted within a second, or intermediate support frame stage 50 (FIG. 1) which preferably is constructed of plural, parallel released beams circumferentially surrounding and spaced from the first frame 24 and coplanar therewith. Again, the second frame is preferably rectangular, with the first frame being mounted to the second frame by means of x-axis and y-axis connectors 64, 65 and 66, 67 respectively, which support the first frame for motion along the x-axis, in the direction of arrow 68, with respect to the second frame. The y-axis connectors 66, 67 are connected between frames 24 and 50 and are laterally flexible mounting springs which allow the frame 24 to move along the x-axis, the mounting springs having high aspect ratios so that they are flexible in the x direction but are substantially inflexible in the z direction. Motion of stage 24 with respect to stage 50 is produced by, and may be sensed by, comb-type drive capacitors 64 and 65 for precise positioning thereof.

Frame stage 50 is, in turn, mounted to an outermost frame stage 100 which is similar in structure to that of frame 50 and is connected thereto by means of spring beam connectors 114 to 117 and 120 to 123 which are flexible in the y direction, indicated by arrow 78, to permit relative y-axis motion between the inner and outer frames. Motion along the y axis is produced by comb-type capacitors 126 and 128 for precise control of the movement of the central stage. Finally, the frame 100 is mounted in the substrate 12 by means of connectors 140–142, 144–146, 154–157, and 160–163. Electrical interconnections between circuitry carried on the substrate 12 and the various control capacitors and the emitter tips carried on the central platform are described in detail in the aforesaid U.S. Pat. No. 5,536,988. This actuator permits precise control of the motion of the emitter tips so that the tips can be moved at precise intervals with respect to a storage medium to be described.

To illustrate the manner in which the actuator 10 of FIG. 1 may be used in combination with an optical storage medium to produce the ultradense, massive memory device of the present invention, reference is now made to FIG. 3. In this figure, the central stage 16 and its emitter tips 22, described above with respect to FIGS. 1 and 2, are represented diagrammatically by the emitter tip 170 mounted on, and unitary with, an actuator 172. The actuator is movable in the x-y directions indicated by arrows 68 and 78 to position the tip at selected locations with respect to, for example, a 10 μm by 10 μm memory region illustrated at 174. The tip is movable incrementally in an x-y plane parallel to, and close to the surface 175 of memory region 174 by means of suitable capacitive controllers such as those illustrated in FIGS. 1 and 2, for example, so that the tip can be positioned accurately and repetitively at selected locations 176 in an x-y grid indicated at 180. The tip 170 may be moved with respect to the region 174 in incremental steps of, for example, 10 nm, as indicated at 182 and 184.

Figure 2:
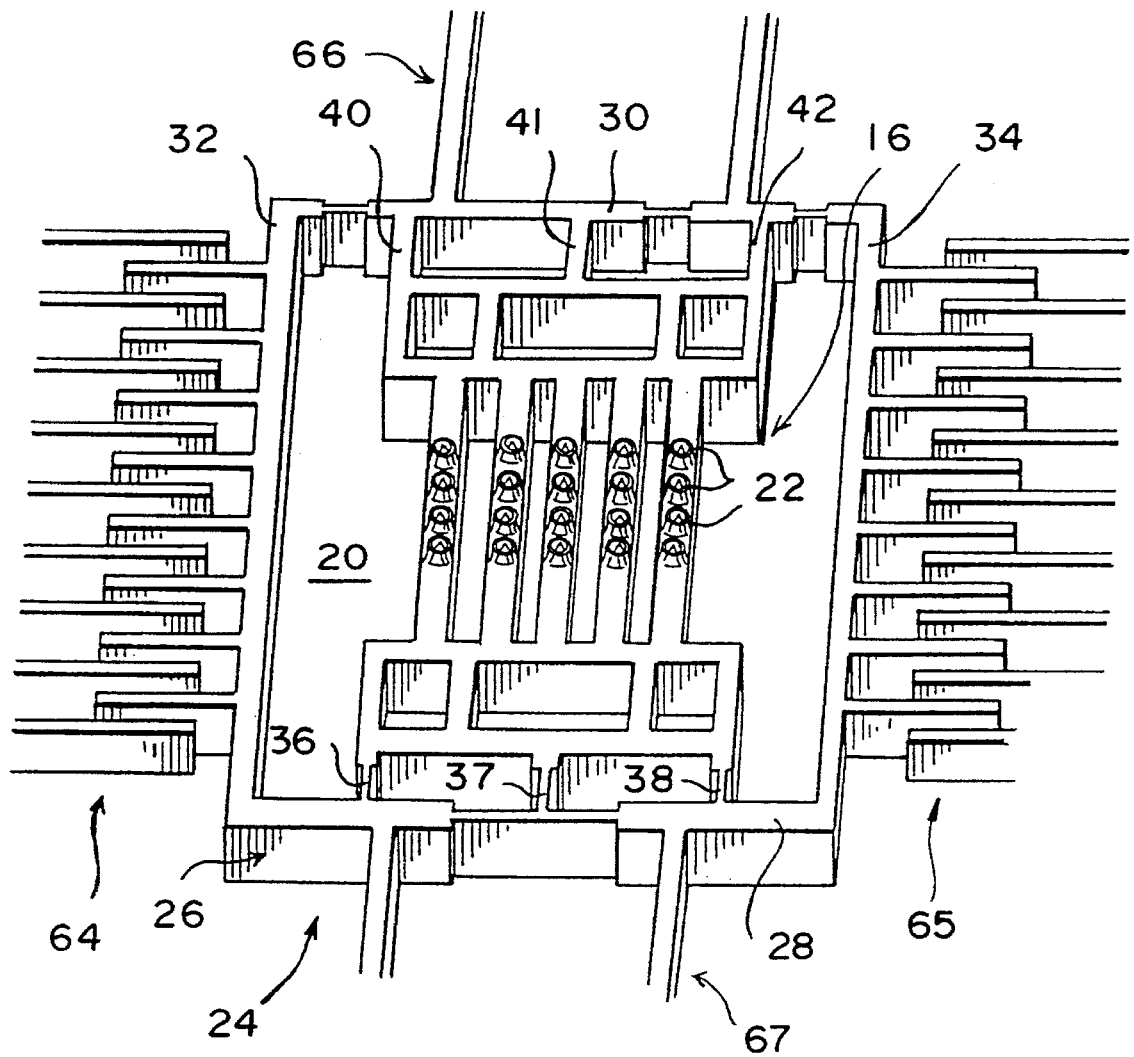
FIG. 2 is an enlarged view of the actuator of FIG. 1, showing an array of nanometer-scale emitter tips.

As illustrated in FIGS. 1 and 2, a multiplicity of closely-spaced tips 170 are provided on the actuator 172. Each tip is tapered and sharpened during the fabrication process described in U.S. Pat. No. 5,536,988, to a minimum diameter on the order of a few nanometers with a height on the order of a few μm, for example. As illustrated in FIG. 4, the actuator (central stage 16) may be a 1 cm by 1 cm platform 188 having an array 190 of emitter tips 170. As illustrated in the bottom view of platform actuator 188, the tips 170 preferably are spaced 10 μm apart, center to center in a regular row and column array. Each tip is associated with, and aligned with, a corresponding memory region 174, shown in phantom in FIG. 4, with all of the tips being movable simultaneously by the controlled movement of actuator platform 188. By mounting the platform to be movable 10 μm in the x direction and 10 μm in the y direction, the entire surface of each of the regions 174 can be incrementally and simultaneously scanned.

Since the tips 170 on actuator platform 188 are spaced 10 μm apart, 1,000 tips can be placed in each row, and 1,000 rows can be provided on a 1 cm$^2$ actuator platform; thus, one million equally spaced tips can be located on the 1 cm square bottom surface of the platform actuator 188. The SCREAM fabrication process described in U.S. Pat. No. 5,536,988, allows the tips to be positioned with great accuracy and reliability, so that an array of one million evenly spaced tips per square centimeter is readily achievable. The capacitive actuator structure exemplified by the capacitive controllers in FIGS. 1 and 2 permit movement of the platform in increments of 10 nm in both x and y directions, and since the diameter of each tip is only a few nanometers, each tip can be positioned at 1,000 locations in each row in the x direction (68) and in 1,000 rows in the y direction, for a total of one million discrete and identifiable locations within its corresponding memory region. With one million tips, each positionable at one million discrete locations, the 1 cm by 1 cm array of tips can specify $1 \times 10^{12}$ storage locations on a storage medium, thus providing ultra high density terabit storage.

An optically-activated memory utilizing multiple emitter tips and corresponding memory regions is illustrated in FIG. 5, to which reference is now made. The memory device, which is generally indicated at 200, includes, in the herein-disclosed embodiment, a wafer, or substrate 202 on which is fabricated a plurality of p-i-n diodes 204 each of which corresponds to a memory region 174. The bottom layers of the diodes are common to all of the memory regions 174, but the top layer 206 of each diode defines a corresponding memory region 174 for receiving a suitable storage medium. The storage medium in each region is a layer 208 of a conductive material on the top surface of a corresponding diode, layer 208 having a surface susceptible to modification by an electric field or a tunneling current. A large number of such materials are available, such as Pt, Pt/Ir, $WSe_2$, Au, Ag, Si, Ge, Pt/Co, Ni/Cr, graphite, and the like. Many such materials are capable of nanometer-scale feature formation by electric fields or tunneling currents produced by scanning emitter tips such as the tips 170, but gold (Au) is particularly attractive because it is chemically stable, easy to deposit and, most important of all, erasable. Patterns formed, or written, on gold surfaces by electric fields are erasable by a voltage pulse of opposite polarity, although the written patterns are otherwise stable and uniform and do not disappear by surface diffusion.

Figure 6:
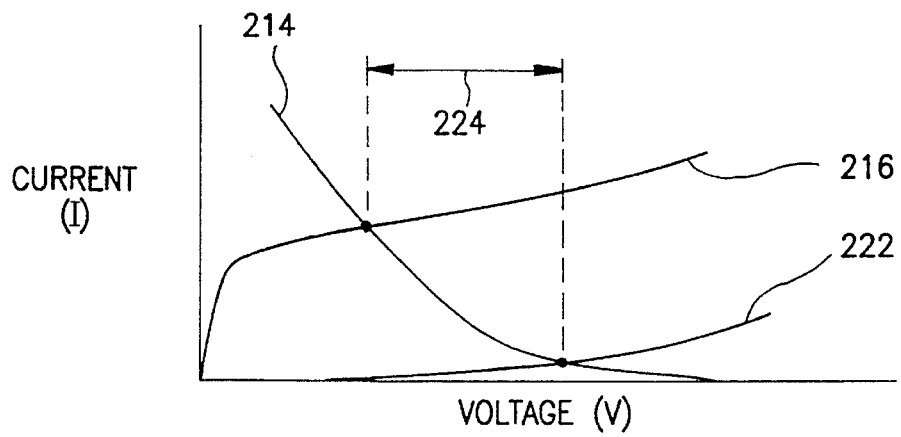
FIG. 6 is a graphical illustration of a load line analysis to determine the voltage swing for pattern writing using the storage device of FIG. 5.

To use the nanometer scale emitter tips 170 to write data on the memory regions 174, each tip is positioned very close to the surface of its corresponding storage medium 208, preferably sufficiently close to permit tunneling currents between the tip and the storage medium. A voltage pulse is generated between the tips and the storage medium to produce a tip-to-surface tunneling current and a corresponding electric field to generate a corresponding marker 209 on the memory surface. Light signals are used to produce such voltage pulses in the present invention, the presence or absence of light serving to control the amplitude and duration of the tip voltage pulses. Data to be written is contained in a spacial pattern of an input beam made up of optical write pulses from an optical write source, the pattern being focused on the bottom surface 210 of the substrate 202 to illuminate the various p-i-n diodes. The optical write pulses are larger in diameter than the tips, and usually will be larger than one of the storage areas 174. The presence or absence of a write pulse at each tip location provides the data pattern which is to be recorded in the memory device 200. The substrate 202 is optically transparent so that an optical write pulse, such as the pulse diagrammatically illustrated at 212 (in FIG. 5) generated by a light source 213 will illuminate a p-i-n diode in a corresponding memory region toward which the light is directed. When illuminated by a corresponding optical pulse, a p-i-n photodiode behaves as a current source, with its photocurrent being proportional to the light intensity. As illustrated in FIG. 6, the voltage across the corresponding tip-surface junction, illustrated by curve 214, has to increase as the photocurrent, illustrated by curve 216, increases in order to maintain current continuity in the memory device. Therefore, an input light pulse, such as the pulse 212, is directed onto at least an entire PIN diode 204, where it creates a corresponding voltage pulse across the nanometer-scale tip-surface junction indicated at 218 in FIG. 5.

For regions 174 of the storage medium 200 which remain unexposed by the optical pattern, as indicated by the light input line 220 in FIG. 5, little or no voltage drop appears between the unexposed storage region and the corresponding tip. This occurs because the reverse bias of the photodiode results in negligible current in this region, as illustrated by curve 222 in FIG. 6. The difference 224 between the voltages provided at exposed and unexposed regions permits selective writing of data, in accordance with the presence or absence of a light pulse.

Typically, to write data, a voltage pulse at the emitter tip 170 of between 3–10 volts with a duration of between a few nanoseconds and a few microseconds is used to form in the conductive layer 208 an identifiable surface feature 209. This feature may be in the form of a mound or a dot of gold having a diameter of about 5 nm, and may represent a data bit "1", for example. In the absence of a light pulse, no such feature will be formed, and the absence of a feature may represent a data bit "0". The data writing process for a bit can normally be completed in a microsecond or less and will produce on the corresponding surface of the storage medium a marker, or bit having a diameter comparable to that of the tip which produced it; i.e., on the order of a few nm. After the memory device 200 has been exposed by a first optical pattern and corresponding bits, or features, have been produced on the conductive surfaces 208 of each p-i-n diode memory region to thereby store a first set, or frame, of optical data, the actuator platform 188 is moved to the next incremental position where the foregoing process is repeated for storage of the next data set or image frame in the memory regions 174. Because of the low mass and high mechanical resonance frequency of the tip and actuator assembly, and because the actuator only moves 10 nm to reach the next storage location, tip travel time from one frame to the next can be on the order of microseconds. The markers can, therefore, be spaced on the order of 10 nm apart, center to center, in a grid or array on the surface of each region 174. One million regions 174 can be provided to correspond to the one million tips 170 so that one million data bits can be recorded (in the foregoing example), one for each tip, to produce a single data frame. Since each tip can be moved to a million different locations in its corresponding memory region, whereby each region can receive one million bits, the memory device can store one million frames. The result is that the 1 $cm^2$ device of the present invention has an equivalent data storage capacity of one terabit, and data storage speed in the range of one terabit per second.

As diagrammatically illustrated in FIG. 5, motion of the actuator platform 188 is controlled by variable voltages applied across capacitors 64 and 65 from variable sources 64' and 65' for motion along the x axis and similarly controlled for motion along the y axis by capacitors (not shown), as described with respect to FIGS. 1 and 2.

The p-i-n photodiodes 204 are quantum well devices of known characteristics, and the optical properties of such devices have been extensively studied. The sensitivity of such diodes determines the minimum power required for data writing, but in the present application it is important that the dark current of the device be kept lower than the tip/surface tunneling current over a wide bias range so that a sufficient contrast ratio is maintained to insure discrimination between data input values. The contrast ratio of the diodes is limited by two related factors, the total thickness of the quantum wells and the maximum bias voltage. Arbitrarily increasing the well thickness without increasing the bias voltage proportionally does not enhance the contrast ratio, since the electric field in each well is reduced. Thus, the selection of the p-i-n photodiode is dependent on the current-voltage characteristics of the tip/surface tunnel junction.

The choice of quantum well and substrate materials for the optical read/write memory device of the present invention requires special attention. If GaAs/AlGaAs quantum wells are used, the GaAs substrate has to be selectively removed since it is opaque. One alternative would be to use InGaAs/InGaAsP or InGaAs/InAlAs quantum wells grown on InP substrates which are transparent at the operating wave length. However, the low band gap InGaAs quantum wells lattice matched to InP substrates normally have higher leakage currents and since pseudomorphic quantum well structures many times thicker than the normal critical thickness can be grown under proper conditions, InGaAs/AlGaAs strained quantum wells may be used on GaAs substrates. Because of the low band gap for InGaAs, the GaAs substrate becomes transparent, which eliminates the necessity to remove the substrate wafer.

Figure 7:
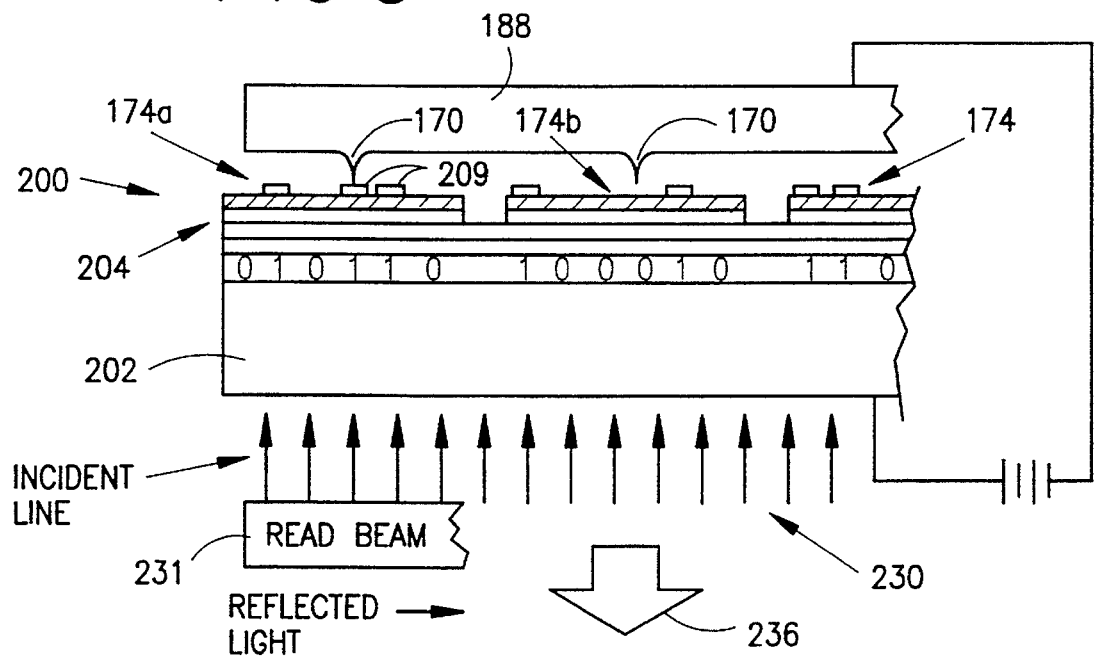
FIG. 7 is a diagrammatic cross-sectional view of an optical parallel readout scheme for the storage device of FIG. 5.

The data stored in the memory regions 174 in the form of the presence or absence of features 209 can be read out optically by flooding the memory device 200 with read light pulses indicated generally at 230 in FIG. 7 from a source 231. The actuator platform 188 is adjusted so that the array of tips 170 is aligned with a selected frame, or data set, location on corresponding memory regions 174. Thus, for example, in the cross-sectional view of FIG. 7, a single row of six memory locations is illustrated for each of the memory regions 174. The left hand region 174a shows three "features", each of which is identified as a "1" data bit, with three locations without features being indicated as "0" data bits, so that region 174a shows a data sequence 010110 for its six positions. In similar manner, the next adjacent memory region 174b shows two features and thus the illustrated row represents a data sequence 100010. By adjusting the actuator platform 188 so that the tips 170 are aligned with the fourth data position in a row (as illustrated), the frame, or data set, corresponding to that data position is read out by the readout beam 230.

Figure 8:
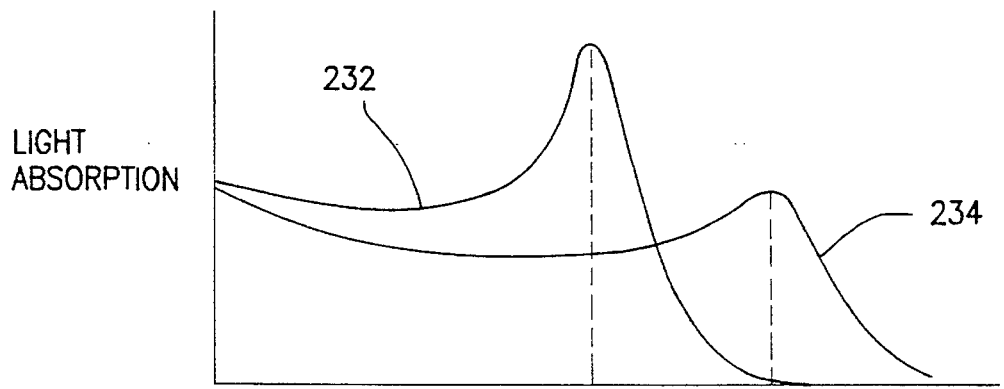
FIG. 8 is a graphical illustration of the absorption spectra for quantum wells under different electric fields as used in the storage device of FIG. 5.

Readout is accomplished when an incident readout beam strikes the bottom surfaces of the p-i-n photodiodes 204, causing an increase in their photocurrents and a corresponding increase in the tunneling current to those tips 170 which are aligned with a feature 209. For each p-i-n diode in which there is a feature aligned with a tip for the particular frame being read out, a higher voltage drop exists in the corresponding quantum well. As is well known, the absorption spectrum for multiple quantum wells changes significantly with the applied electric field due to the well-known quantum confined Stark effect, as illustrated in FIG. 8. Curve 232 illustrates the absorption wavelength for a low applied electric field in a multiple quantum well, while curve 234 shows the absorption peak for a high applied electric field. As illustrated, the exotonic absorption peak is red-shifted by the applied electric field and thus is red-shifted toward the wavelength of the readout beam 230.

The incident read beam is reflected from the bases of the diodes 204, with the reflection from diodes in which a feature is aligned with the corresponding tip 170 showing a weaker intensity in the reflected beam, as generally illustrated at 236 in FIG. 7. The different intensities in the beams reflected from the 1 and 0 states, due to the different absorption coefficients of the respective diodes, produces a spacial pattern in the reflected beam 236 which corresponds to the data in the individual memory regions 174 at the selected frame position. Since a photocurrent in the diodes 204 is also used to produce the features 209, it will be understood that to make the readout process nondestructive, an optical readout pulse duration shorter than the material response time must be used. Since the fastest material response to an electric field is about 100 ns, a light pulse of 1 ns is sufficiently short for nondestructive data readout, and light pulses of this length can routinely be achieved by Q-switched semiconductor lasers.

In spite of the advantages of the foregoing optical storage and readout system, the moderate contrast ratio between the 1 and the 0 datapoints requires complicated optical components in order to provide an accurate readout. One cost-effective solution to this problem is to integrate an optoelectronic transition circuit and amplifier in the storage device itself. This can be accomplished by the use of optoelectronic thyristors of the type illustrated in FIGS. 9–14, to which reference is now made.

FIG. 9 illustrates an optoelectronic parallel read/write memory device 250 which includes a plurality of memory regions 174, as previously discussed, with a closely adjacent, relatively movable actuator platform 188 carrying multiple tips 170, also as discussed above. In this case, however, each memory region 174 is constructed of a pnpn thyristor 252 configured as illustrated in the corresponding equivalent circuit 254 of FIG. 10. Thus, the thyristor includes a p layer 256 of AlGaAs, an n layer 257 of GaAs, a p layer 258 of InGaAs, and an n layer 259 of AlGaAs on an n-type GaAs substrate 260. The actuator 188 is negatively biased with respect to the substrate 260 by source 262, and the top layer 256 of the thyristor 252 is open, or floating, in the write mode.

The n layer 257 of the thyristor carries the conductive layer 208, as discussed above with respect to FIG. 5, on which the features 209 are formed by tunneling currents from corresponding tips 170. The tunneling junction 218 between the tips 170 and the surface of the conductive layer 208 is illustrated in the equivalent circuit of FIG. 10, also at 218. The n type GaAs substrate is transparent to input light pulses 212 so that the memory device 250 can be back-illuminated without having to remove the substrate 260.

Since the top p layer 256 is floating, the pnpn structure behaves as a heterojunction npn bipolar phototransistor having its base current proportional to the input light intensity. As illustrated in the load line analysis of FIG. 11, wherein the load line of the tunneling junction 218 is illustrated by curve 264, the light pulse 212 produces a voltage-current characteristic illustrated by curve 266, while the absence of light, indicated by light line 220 in FIG. 9, results in a voltage-current curve 268 by representing the dark current; i.e., or a data input 0. The magnitude of the voltage pulses can be tuned with the light intensity.

As illustrated in FIG. 11, the presence or absence of a light pulse produces a voltage swing 270 which can be adjusted from less than one volt to more than five volts, in the illustrated embodiment, the voltage level being selected to be sufficient to produce the data features 209, as discussed above. As discussed above, the input pulses 212 and 220 represent optical data supplied in parallel to a selected position, or frame, for the actuator 188 to produce corresponding data points or features on the memory segments 174. The actuator 188 is then moved to a next selected frame location and another optical light pattern is directed to the memory device to record a next frame of data.

To read data stored in the form of features 209 in the optoelectric memory device 250, the device is operated as a light emitting thyristor, as illustrated in FIG. 12, wherein similar components are similarly numbered to the illustrations of prior figures. The circuit connection for the data readout includes a lead line 280 connected by way of contact 282 to the p layer 256, to which a trigger voltage $V_0$ may be applied. The resulting equivalent circuit is illustrated in FIG. 13, where the pnpn layers operate as a feedback loop made up of a pnp transistor 284 and an npn transistor 286 interconnected base to collector, as shown. When the loop gain is equal to 1 in such a circuit, the feedback becomes positive and a large current is built up, only limited by the load resistor 288 connected to the emitter of transistor 284. The pnpn thyristor 252 is responsive to a minor change in the tunneling current flowing through the tip/surface tunnel junction 218 to the base of the pnp transistor 284. An extra current of a few nanoamperes can turn the thyristor from an off-state to an on-state, resulting in an exceedingly large contrast ratio.

One feature of this design is that the optoelectronic thyristor 252 behaves as an optical memory by itself, so that once it is turned on, it remains on, even when the turn-on signal, which is the tunnel current, is removed. Therefore, a reset signal 290 is required to reset the optoelectronic memory before the tips 170 are moved to a new position for the next read or write operation. The voltage $V_0$ having an on value shown at 290 is applied by way of line 280 to the thyristor 252 to provide a read cycle in the memory. A reset cycle portion 294 follows the read cycle to reset the read circuitry for the next read cycle.

To read the data stored on the layer 208, the actuator 188 is moved to align the tips 170 with a selected frame location, and a read voltage $V_0$ is applied to p layer 256 in each memory region, switching the respective thyristors on and producing an output light beam 296 having a spacial pattern corresponding to the data being read. The p layer 258 is the light emitting layer, and since the substrate 260 is transparent, the light beam 296 is emitted. As indicated by the load line 300 in FIG. 14, application of the voltage $V_0$ produces a very low light output representing a data "0" for the memory regions 174 where no feature is aligned with the tip 170, and produces a relatively high output representing a data "1" where a feature is present. It is noted that both the actuator 188 and the substrate 260 are at ground potential so that the application of voltage $V_0$ at line 280 produces a voltage across the tunnel junction 218 to provide the required turn on voltage for the pnpn thyristor.

Figure 15:
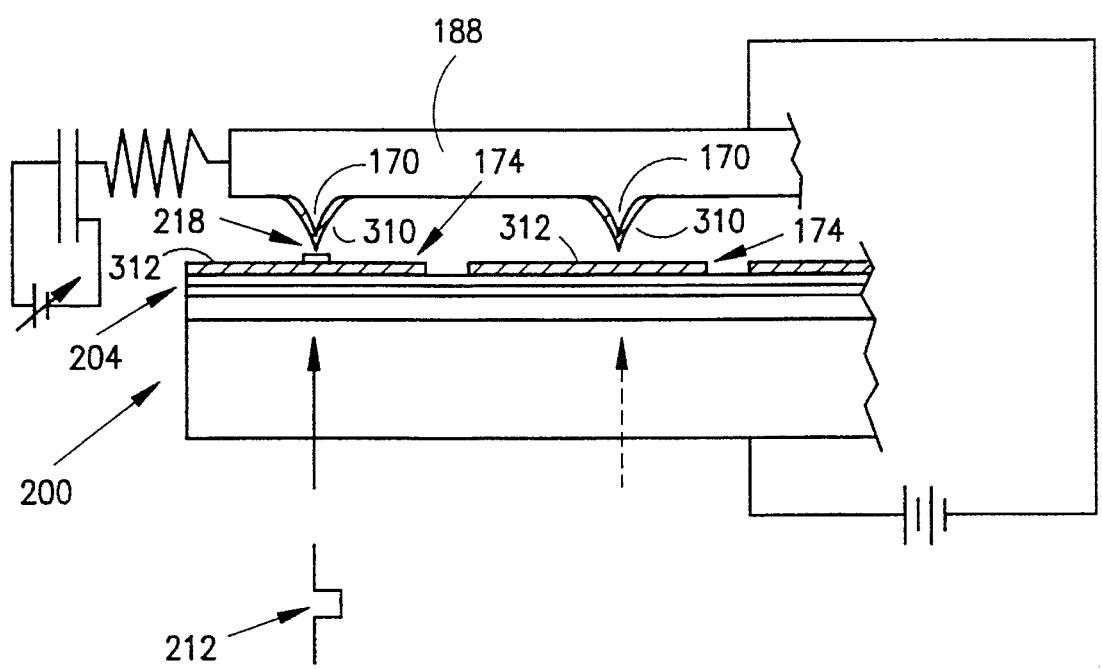
FIG. 15 is a diagrammatic cross-sectional view of a third embodiment of the invention.

Another form of the invention is illustrated in FIG. 15, wherein the memory device of FIG. 1 is modified by eliminating the conductive layer 208 on the upper surface of the pin diode 204. Instead of this conductive layer, a metal or metal coated tip 170 is provided, the tip having, for example, a thin layer 310 of gold. The tips are positioned at selected locations adjacent the top layer 312 of the p-i-n diode. In the writing cycle, reverse-biased voltage pulses are applied between the tip and the semiconductor p/n junction by the application of a spatially patterned light beam, as previously discussed. At those memory regions 174 where no light is directed, the voltage drop occurs primarily in the reverse-biased pn junction of the diode 204 and no data writing is produced. However, where the light is on, as at pulse 212, the photocurrent reduces the resistivity across the pn junction and the voltage drop is switched to the tip-semiconductor junction 218. The resulting strong electric field around the tip area stimulates ion emission, so a small metal dot is ejected from the tip onto the semiconductor surface, whereby a "bit" is written. Thus, light is the enabling signal for data writing. The required power to control the writing process can be less than 1 microwatt, and there are no specific requirements on its wavelength and coherence. Commercially available semiconductor laser diodes and LEDs can be used as the light source.

In the reading cycle, the tunneling tip 170 is scanned over the semiconductor surface with a forward bias voltage applied between the tip and the surface. In the unwritten area, the contact resistance between the tip and the semiconductor is high enough to block any current injection. When the tip contacts, or is close to, the metal dot, or feature, written on the semiconductor surface, a much lower contact resistance is achieved and the current injected into the semiconductor quantum wells generates light emission for optical reading, as discussed above. Because of the high quantum efficiency for the semiconductor quantum wells, a1mA current pulse with a 0.001% duty cycle can generate enough light for detection by a CCD camera. This corresponds to a continuous wave current of 10 nA to read a "bit". Such a small power consumption allows one million bits to be read simultaneously in a 1,000 by 1,000 tip array. Furthermore, the data storage material itself is a light emitting material so no external light source is required.

Although the present invention has been described in terms of preferred embodiments, it will be apparent that numerous modifications and variations can be made without departing from the true spirit and scope thereof.

What is claimed is:

1. Data storage and readout apparatus, comprising:
   a photoconductive storage medium having a storage surface including a plurality of memory regions;
   an array of nanometer scale emitter tips, each tip corresponding to each memory region and movably mounted closely adjacent its corresponding memory region, each said tip being responsive to photoconduction in said storage medium to produce on a memory region of said storage surface at a location in alignment with a corresponding tip;
   a data feature corresponding to data to be stored; and
   means responsive to said data feature to read data stored on said memory region of said storage surface.

2. The apparatus of claim 1, wherein said storage medium is a semiconductor which is photoconductive in response to the presence of light to produce a corresponding current between each said tip and its corresponding memory region on said storage surface to thereby produce said data feature.

3. The apparatus of claim 1, wherein each said emitter tip is mounted on an actuator for motion with respect to its corresponding memory region, each said tip being tapered and having a minimum diameter on the order of a few nanometers.

4. The apparatus of claim 1, wherein each said data feature comprises the presence or absence of an electrically conductive dot formed on said storage surface.

5. The apparatus of claim 3 wherein said storage medium is a semiconductor which is photoconductive in the presence of light to cause said tips to produce corresponding data features on said storage surface which correspond to the intensity of the light.

6. The apparatus of claim 5, wherein said actuator is movable in a plane parallel with said storage medium to position said tip at a selected one of a multiplicity of locations with respect to said storage medium for production of a data feature at the selected location in response to a corresponding presence or absence of light.

7. The apparatus of claim 6, wherein said storage surface is a conductive layer on said semiconductor.

8. The apparatus of claim 5, wherein each said memory region comprises a thyristor, and wherein said means responsive to said data feature to read data stored on said storage surface comprises a read voltage applied between each said memory region and its corresponding tip to cause the thyristor to emit light in accordance with the presence or absence of a data feature at the location of the corresponding tip to produce a read data beam of light.

9. High density parallel data storage and readout apparatus, comprising:

a storage medium having a multiplicity of storage regions;

an electrically conductive data storage surface for each said storage region;

an actuator controllably movable with respect to said data storage surfaces;

an array of emitter tips on said actuator, each tip having a diameter of a few nanometers and corresponding to one of said data storage surfaces, each said tip being movable by said actuator to alignment with a selected one of a multiplicity of data storage locations on its corresponding data storage surface; and means for actuating selected tips to produce readable data features on said data storage surfaces.

10. The apparatus of claim 9, further including a readout light beam incident on said storage medium for simultaneously activating tips aligned with readable data features to produce an output light beam corresponding to said data features.

11. The apparatus of claim 9, wherein said storage medium comprises a multiplicity of light-producing semiconductor devices activatable in accordance with the locations of said features to produce a corresponding readout beam.

12. The apparatus of claim 9, wherein said means for actuating selected tips includes an optical data image impinging on at least a portion of said multiplicity of storage regions to produce electrical current between selected storage regions and corresponding tips to produce data features corresponding to the optical data image impinging thereon.

13. The apparatus of claim 12, wherein each said tip is movable by said actuator for selective alignment with one of said multiplicity of data storage locations on its corresponding storage surface.

14. The apparatus of claim 13, wherein all said tips in said array are movable by said actuator simultaneously for alignment with corresponding data storage locations in said respective storage regions.

15. The apparatus of claim 14, wherein said actuator is movable to align each of said tips with a first corresponding data storage location on its respective storage surface for producing a first set of readable data features representing a first optical data image, and is further movable to align each of said tips with a second corresponding data storage located on its respective storage surface for producing a second set of readable data features representing a second optical data image.

16. The apparatus of claim 14, wherein said actuator is movable to align each of said tips with any one of a multiplicity of corresponding data storage locations on said respective storage surfaces, whereby a multiplicity of data features are storable on each surface.

17. The apparatus of claim 9, wherein said actuator is movable to align each of said emitter tips with a predetermined one of a multiplicity of corresponding data storage locations on its corresponding data storage surface, whereby said readable data features are producible at predetermined locations on each said data storage surface.

18. The apparatus of claim 17, wherein said actuator is movable to selectively align each tip with each of said multiplicity of data storage locations on its corresponding data storage surface, the data features at corresponding data storage locations in all of said data storage surfaces representing a data image, whereby said storage surfaces are capable of storing a multiplicity of data images.

19. The apparatus of claim 18, further including an optical readout responsive to said data features at selected data storage locations to optically reproduce the data images represented by the data features at said selected location.

20. The apparatus of claim 9, wherein said means for actuating selected tips includes:

an optical image on said multiplicity of data storage regions; and means applying a voltage between said array of tips and said storage medium whereby said image activates selected tips to produce readable data features representing said image on said data storage surfaces.

21. The apparatus of claim 20, further including means responsive to said data features for reproducing said image including a readout beam incident on said storage medium.

22. The apparatus of claim 9, wherein said storage medium is a semiconductor, and wherein each said storage region is a photoconductive diode.

23. The apparatus of claim 22, wherein said data storage surface on each data storage region comprises a layer susceptible to modification by an electric field for production of plural readable data features.

24. The apparatus of claim 23, wherein said data storage surface is a thin layer of gold.

25. The apparatus of claim 9, wherein each tip of said array of emitter tips comprises a microelectromechanical cathode.

26. The apparatus of claim 25, wherein said tips of said array of tips are spaced about 10 µm apart.

27. The apparatus of claim 25, wherein said actuator comprises a microelectromechanical multistage support assembly having a central stage supporting said array of emitter tips.

28. The apparatus of claim 27, wherein said storage surfaces lie in a first plane and wherein said support assembly supports said array of emitter tips for motion in a second plane parallel to said first plane.

29. The apparatus of claim 27, wherein each said storage region is a p-i-n photodiode.

30. The apparatus of claim 27, wherein each said storage region is a thyristor.

31. The apparatus of claim 27, wherein each said data storage surface comprises a layer of material susceptible to modification by an electric field for production of said readable data features.

32. The apparatus of claim 31, further including means for applying a voltage between said array of tips and said storage medium, whereby an optical image applied to said storage medium activates selected tips to produce readable data features on said storage surfaces representing the optical image.

33. The apparatus of claim 32, further including means responsive to data features on said storage surfaces for reproducing the optical image represented by such data feature.

34. A data storage system combining mechanically scanned nanometer-scale tips with optical imaging to produce high resolution, high density optical data storage, comprising:

a photoconductive storage medium having a top and a bottom surface;

a movable platform closely adjacent said top surface;

an array of emitter tips mounted on said platform, said tips being of nanometer scale and being closely adjacent said top surface;

an optical image having a light intensity pattern directed onto said bottom surface to produce simultaneous voltage pulses between said top surface and adjacent tips, said voltage pulses at said tip having amplitudes corresponding to light intensity at corresponding adjacent top surface locations to activate tips in the array in accordance with said light intensity pattern to thereby provide simultaneous parallel outputs from the activated tips and means on said top surface responsive to said parallel outputs for producing markers representing an image data frame for data storage.

35. The system of claim 34, further including means for moving said array to scan said image to thereby obtain a multiplicity of image frames.

36. The system of claim 34, further including means for moving said array to record additional images.

37. The system of claim 34 wherein said storage medium is a p-i-n photodiode, and wherein said means on said top surface is a thin layer of electrically conductive material having surface properties which are changed by the application of said voltage to produce data feature marker adjacent each activated tip, the presence or absence of a data feature representing a stored data state.

38. The system of claim 37, further including a read beam directed toward said bottom surface, said read beam being reflected from said storage medium in accordance with different absorption coefficients dependent on, and corresponding to, the presence or absence of, and to the location of, stored data features to produce a nondestructive optical parallel readout of stored optical data.

39. The system of claim 34, wherein said storage medium is a pnpn phototransistor for increasing contrast in said light intensity pattern.

40. The system of claim 39, wherein said means on said top layer comprises a layer of electrically conductive material, said material having surface properties which are changed by the application of said voltage to produce a data feature marker adjacent each activated tip, the presence or absence of a data feature representing a recorded data state.

41. The system of claim 40, further including a voltage between said top surface and said emitter tips to cause a current to flow between said storage medium and any tips aligned with a data feature, said current flow turning on said pnpn phototransistor in the presence of a data feature to cause the phototransitor to emit light in a pattern corresponding to said data features.

42. A method for parallel storage of optical data, comprising:

directing optical data including a special pattern of illuminated and dark areas to be stored onto a storage medium incorporating a multiplicity of photoconductive storage regions, wherein each storage region includes an electrically conductive storage surface susceptible to modification to produce a structural data feature;

aligning a movable microelectromechanical tip having a minimum diameter of a few nanometers with a selected data storage location on the storage surface of each storage region; and applying an electric field between each said tip and its corresponding storage surface to produce at the selected data storage location on each said storage surface a data feature having a diameter corresponding to that of said tip and representing that area of the optical pattern which is incident on the corresponding storage region, whereby a single data feature at the selected storage location on each of said multiplicity of storage region surfaces stores said optical data.

43. The method of claim 42, further including:

shifting each said tip for alignment with a second selected data storage location on its corresponding storage region;

directing a second optical data pattern to be stored onto said storage medium; and applying said electric field between each said tip and its corresponding storage surface to produce a second data feature on each said corresponding storage region, whereby a single data feature at the second data storage on each of said multiplicity of storage region surfaces stores said second optical data pattern.

44. The method of claim 43, further including:

shifting each said tip for sequential alignment with multiple data storage locations on corresponding storage regions;

sequentially directing multiple optical data patterns onto said storage medium; and applying said electric field to produce multiple data features on each corresponding storage region for sequentially storing said multiple optical data patterns.

45. The method of claim 44, further including:

aligning said tips with a selected data storage location on each of said storage region surfaces; and applying a read voltage between said tips and said storage region surfaces to cause said storage medium to emit a pattern of light corresponding to the data features stored in the selected data storage locations to thereby read said stored optical data.

46. The method of claim 44, further including:

aligning said tips with a selected data storage location on each of said storage region surfaces;

applying a read voltage between said tips an said storage region surfaces; and directing a read beam of light onto said storage medium to produce a reflected pattern of light corresponding to the data features stored in the selected data storage locations.

47. The method of claim 42, wherein aligning said tips includes positioning each tip sufficiently close to its corresponding storage surface to permit tunnelling currents between each tip and its storage surface, and wherein applying an electric field to a storage surface receiving light from an illuminated area of said optical data pattern produces a data feature in the form of a marker at the selected location on said storage surface and applying an electric field between a tip and a storage surface which is receiving light from a dark area of said optical data pattern produces a data feature in the form of an absence of a marker at the selected location on said storage surface.

48. The method of claim 41 wherein directing an optical data pattern onto a storage medium includes directing an optical input beam containing optical write pulses onto said storage medium, said optical pulses each having a diameter larger than the diameters of said tips, the presence or absence of optical write pulses providing said special pattern.

49. The method of claim 41, further including scanning said tips over multiple storage locations on corresponding storage regions and applying an electric field and a special pattern of optical data for each storage location for storing multiple frames of optical data on said storage medium.

* * * * *

UNITED STATES PATENT AND TRADEMARK OFFICE
CERTIFICATE OF CORRECTION

PATENT NO. : 5,615,143
DATED : March 25, 1997
INVENTOR(S) : MACDONALD, et al.

It is certified that error appears in the above-indentified patent and that said Letters Patent is hereby corrected as shown below:

Claim 1, at col. 12, change lines 36 and 37 to read:

--with a corresponding tip[;] a data feature corresponding to data to be stored; and--.

Claim 15, at col. 13, line 51, change "located" to --location--.

Claim 34, at col. 15, line 7, change "tip" to --tips--.

Claim 37, at col. 15, line 25, after "produce" insert --a--.

Add the following claim:

--50. The apparatus of claim 5, wherein each said memory region includes a photodiode, and wherein said means responsive to said data feature to read data stored on said storage surface comprises a light beam impinging on said storage medium, said light beam being reflected from each memory region of said storage medium in accordance with the data feature at the location on the memory region corresponding to the location of each said tip.--

Signed and Sealed this

Fifth Day of August, 1997

*Attest:*

BRUCE LEHMAN

*Attesting Officer*    Commissioner of Patents and Trademarks